(12) United States Patent
Fan et al.

(10) Patent No.: US 10,259,005 B2
(45) Date of Patent: Apr. 16, 2019

(54) ROTATIONAL PAINT CURING DEVICE

(71) Applicant: GM GLOBAL TECHNOLOGY OPERATIONS LLC, Detroit, MI (US)

(72) Inventors: Hua-tzu Fan, Troy, MI (US); Jorge Arinez, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 223 days.

(21) Appl. No.: 15/267,170

(22) Filed: Sep. 16, 2016

(65) Prior Publication Data

US 2018/0078961 A1 Mar. 22, 2018

(51) Int. Cl.
*B05B 13/02* (2006.01)
*B62D 65/00* (2006.01)
*B62D 65/18* (2006.01)
*F26B 15/14* (2006.01)
*F26B 25/00* (2006.01)

(52) U.S. Cl.
CPC .......... *B05B 13/0235* (2013.01); *F26B 15/14* (2013.01); *F26B 25/003* (2013.01); *B62D 65/00* (2013.01); *B62D 65/18* (2013.01); *F26B 2210/12* (2013.01)

(58) Field of Classification Search
CPC ............ B05B 13/0285; B05B 13/0221; B05B 13/0228; B05B 13/0235; B23Q 3/04; B66F 7/26
See application file for complete search history.

(56) References Cited

U.S. PATENT DOCUMENTS

| | | | | |
|---|---|---|---|---|
| 2,141,639 A | * | 12/1938 | Catalano | B60S 9/10 73/669 |
| 2,598,201 A | * | 5/1952 | Williams | B05B 13/0235 118/304 |
| 2,678,025 A | * | 5/1954 | Straky | B05B 13/0235 118/320 |
| 2,950,990 A | * | 8/1960 | Johnson | B05D 1/002 118/52 |
| 4,874,639 A | * | 10/1989 | Matsui | B05B 13/0221 118/56 |
| 4,988,537 A | * | 1/1991 | Tanimoto | B05B 13/0221 427/379 |
| 5,094,183 A | * | 3/1992 | Hamasaki | B05C 11/08 118/320 |
| 8,831,921 B2 | | 9/2014 | Tilove et al. | |
| 2002/0023585 A1 | * | 2/2002 | Sashihara | B05B 13/0235 118/313 |
| 2015/0064482 A1 | | 3/2015 | Fan et al. | |

* cited by examiner

*Primary Examiner* — Tyrone V Hall, Jr.

(57) ABSTRACT

A workpiece carrier includes a base frame, a fixture base, a plurality of locators, and a drive source. The fixture base is secured to the base frame. Each of the plurality of locators is secured at a first end to the fixture base and at a second end to a workpiece. The drive source is in communication with the fixture base for rotationally driving the fixture base with respect to the base frame.

15 Claims, 4 Drawing Sheets

ROTATIONAL PAINT CURING DEVICE

FIELD

The present disclosure relates generally to coated articles, and more particularly to a rotational paint curing device for uniformly coating articles.

INTRODUCTION

The statements in this section merely provide background information related to the present disclosure and may not constitute prior art.

Workpieces (e.g., vehicle bodies) can be coated for several reasons. As an example, coatings may be applied to provide the workpiece with an aesthetically pleasing appearance. As another example, coatings may be applied to provide the workpiece with a protective coating. The protective coating may shield the workpiece from the elements (e.g., rain, snow, ice), and/or from degradation due to moisture, salt exposure, oxidation, or the like.

SUMMARY

A workpiece carrier includes a base frame, a fixture base, a plurality of locators, and a drive source. The fixture base is secured to the base frame. Each of the plurality of locators is secured at a first end to the fixture base and at a second end to a workpiece. The drive source is in communication with the fixture base for rotationally driving the fixture base with respect to the base frame.

According to various embodiments, the base frame includes a pair of extending legs defining an axis extending therethrough, and the fixture base is secured to the extending legs such that rotation of the fixture base causes the workpiece to rotate around the axis.

According to various embodiments, the drive source is a motor that rotationally drives a gear set at a predetermined spin rate.

According to various embodiments, the base frame is secured to a ground surface or to an automated guided vehicle.

According to various embodiments, the drive source is a drive wheel extending from the base frame for movement along a conveyor track, and the drive wheel is in communication with the fixture base through a drivetrain.

According to various embodiments, at least one of the plurality of locators is a pivoting locator having a lower support portion and an upper support portion pivotably secured together.

According to various embodiments, at least one of the plurality of locators is an eccentric locator having an upper support portion and a lower support portion with an eccentric cam rotationally secured thereto, and the upper support portion follows the eccentric cam such that rotation of the eccentric cam causes movement of the workpiece toward and away from the fixture base.

A workpiece carrier includes a base frame having a pair of extending legs. A fixture base is secured to the base frame at the pair of extending legs. At least one locator is secured at a first end to the fixture base and at a second end to a workpiece. Furthermore, a drivetrain for rotating the workpiece includes a drive wheel extending from the base frame. A drive gear is in communication with the drive wheel, wherein the drive gear receives a rotational force from the drive wheel. A driven gear is in communication with the drive gear and with a worm, and the driven gear receives a rotational force from the drive gear. A worm gear is in communication with the worm and with the fixture base, with the worm gear being rotationally driven by the worm. In addition, rotation of the drive wheel rotationally drives the fixture base with respect to the base frame.

A workpiece carrier includes a base frame having a pair of extending legs. A fixture base is secured to the base frame at the pair of extending legs. A drive source is in communication with the fixture base for rotationally driving the fixture base with respect to the base frame. A pivoting locator has an upper pivot support portion and a lower pivot support portion pivotably secured together. The upper pivot support portion is secured to a workpiece and the lower pivot support portion is secured to the fixture base. An eccentric locator has an upper eccentric support portion and a lower eccentric support portion with an eccentric cam rotationally secured thereto. The upper eccentric support portion is secured to the workpiece and the lower eccentric support portion is secured to the fixture base. Furthermore, the upper eccentric support portion follows the eccentric cam such that rotation of the eccentric cam causes movement of the workpiece toward and away from the fixture base.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
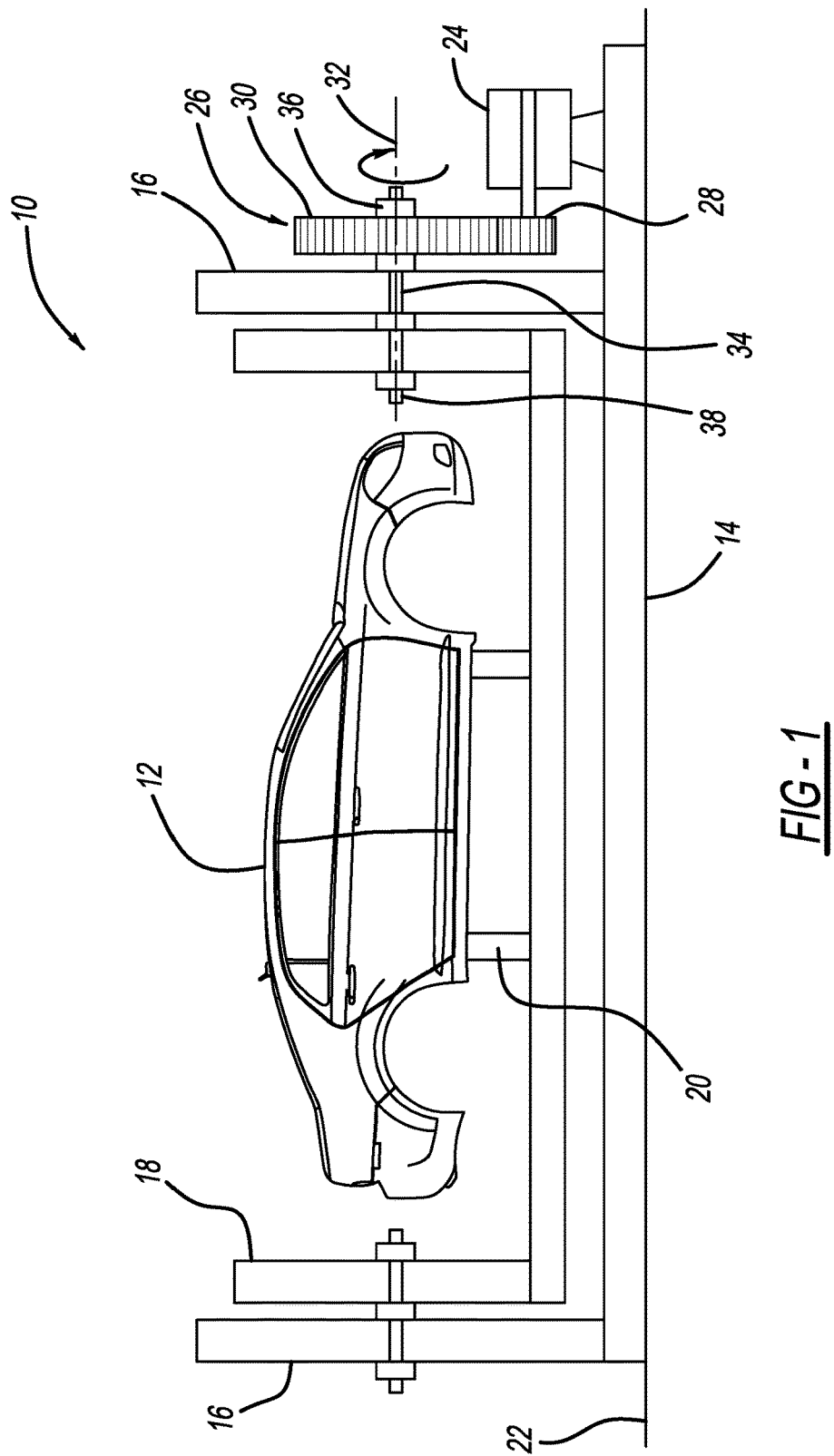
FIG. 1 is a perspective view of a rotational carrier according to the present disclosure.

The following description is merely exemplary in nature and is not intended to limit the present disclosure, application, or uses. Furthermore, there is no intention to be bound by any expressed or implied theory presented in the preceding field, introduction, summary or the following detailed description. It should be understood that throughout the drawings, corresponding reference numerals indicate like or corresponding parts and features. Further, directions such as "top," "side," "back", "lower," and "upper" are used for purposes of explanation and are not intended to require specific orientations unless otherwise stated. These directions are merely provided as a frame of reference with respect to the examples provided, but could be altered in alternate applications. Conventional techniques and components related to vehicle electrical and mechanical parts and other functional aspects of the system (and the individual operating components of the system) may not be described in detail herein for the sake of brevity. It should be noted, however, that many alternative or additional functional relationships or physical connections may be present in an embodiment of the invention.

Additionally, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The following description also refers to elements or features being "connected" or "coupled" together. As used herein, these terms refer to one element/feature being directly or indirectly joined to (or directly or indirectly communicating with) another element/feature, but not necessarily through mechanical means. Furthermore, although the schematic diagrams shown herein depict example arrangements of elements, additional intervening elements, devices, features, or components may be present in an actual embodiment.

In an exemplary paint coating process for an unfinished workpiece (e.g., a vehicle body), the unfinished workpiece is presented to a dip coating station and immersed in a coating material (e.g., sol-gel material) at a constant speed. Upon exiting the dip coating station, excess wet coating material will drain from the vertical surfaces of the workpiece due to a gravity effect. The coated workpiece can then be presented to a curing station where the gravity pull on the wet coating material may continue. Upon completion of the curing process, the coated workpiece can have a film thickness that tends to be thinner at the top portion of the vertical surface and that grows thicker towards the bottom portion of the vertical surface. Furthermore, the gravity effect can cause microsagging of the film, which can manifest as a bumpy, wavy, or "orange-peel" surface.

With reference now to FIG. 1, an exemplary rotational carrier 10 according to the present disclosure is shown for use in a paint coating process for a workpiece 12. The exemplary rotational carrier 10 is capable of rotation during the curing process, thereby neutralizing the gravity effect and providing a more uniform film coating thickness on all surfaces of the workpiece 12. The rotational carrier 10 may include a base frame 14 having a pair of vertically extending legs 16 and a rotating fixture base 18 having a plurality of locators 20. The base frame 14 may be secured to a ground surface 22 within a paint coating facility with the fixture base 18 removably located thereon. In this way, the workpiece 12 may be secured to the fixture base 18 at the locators 20 prior to entering a dip coating station. After exiting the dip coating station, the fixture base 18 may be mounted to the vertically extending legs 16 of the base frame 14. In another alternative, the workpiece 12 may be secured to a dip coating fixture at the dip coating station and may be transferred to the fixture base 18 prior to entering the rotational curing station. After mounting to the legs 16 of the base frame 14, the rotating fixture base 18 may be arranged in communication with a drive source 24 (e.g. motor) through a gear set 26. The rotational carrier 10 may be used in a stationary curing process, such that the drive source 24 provides a rotational force on a drive gear 28 of the gear set 26. The drive gear 28, in turn, rotationally drives a driven gear 30 of the gear set 26 around an axis of rotation 32, which extends through the vertically extending legs 16 of the base frame 14. The driven gear 30 may be secured to an axial shaft 34 at a first end 36 of the shaft 34. The shaft 34 may extend through the vertically extending legs 16 of the base frame 14, with a second end 38 of the shaft 34 being secured to the fixture base 18. Accordingly, the drive source 24 may be used to rotationally drive the fixture base 18 at a predetermined spin rate. The predetermined spin rate is selected to be consistent with a drying rate (e.g., drying speed) for the coating material applied to the workpiece 12 (e.g., 1 to 10 RPM). In one example, the spin rate may complete one full revolution of the fixture base 18 during the allotted dry time. As such, no surface of the workpiece 12 remains in a vertical orientation for an extended period, thereby minimizing the gravitational effects on the coating thickness.

It should be understood that while the base frame 14 is described as being secured to the ground surface 22, it is also contemplated that the base frame 14 can be secured to an automated guided vehicle (AGV). The rotational carrier 10 may then be movable between operations involving the workpiece 12. In another alternative, the base frame 14 may be secured to a turntable bearing (not shown) arranged on a turntable base (not shown) for providing another degree of freedom for yaw rotation.

Figure 2:
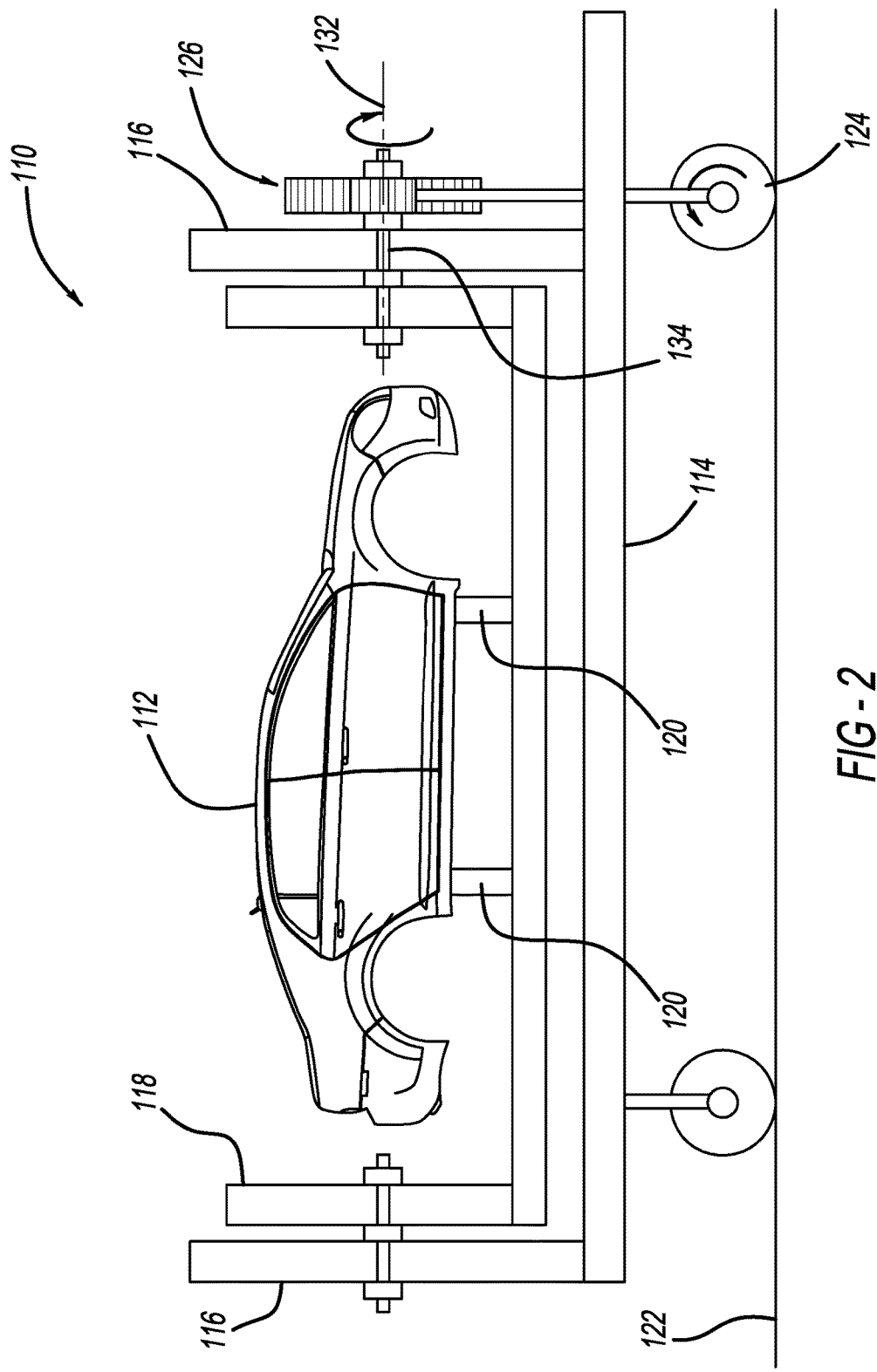
FIG. 2 is a perspective view of another rotational carrier according to the present disclosure.

With reference now to FIG. 2, another exemplary rotational carrier 110 according to the present disclosure is shown for use in a paint coating process for a workpiece 112 moving along a conveyance system (not shown). Various features of the rotational carrier 110 are similar to features of the rotational carrier 10, and therefore, like reference numerals will be used to describe like features. The exemplary rotational carrier 110 is also capable of rotation during the curing process, thereby neutralizing the gravity effect and providing a more uniform film coating thickness on all surfaces of the workpiece 112. The rotational carrier 110 may include a base frame 114 having a pair of vertically extending legs 116 and a rotating fixture base 118 having a plurality of locators 120. The workpiece 112 may be secured to the fixture base 118 at the locators 120 and the fixture base 118 may be mounted to the vertically extending legs 116 of the base frame 114.

Figure 3A:
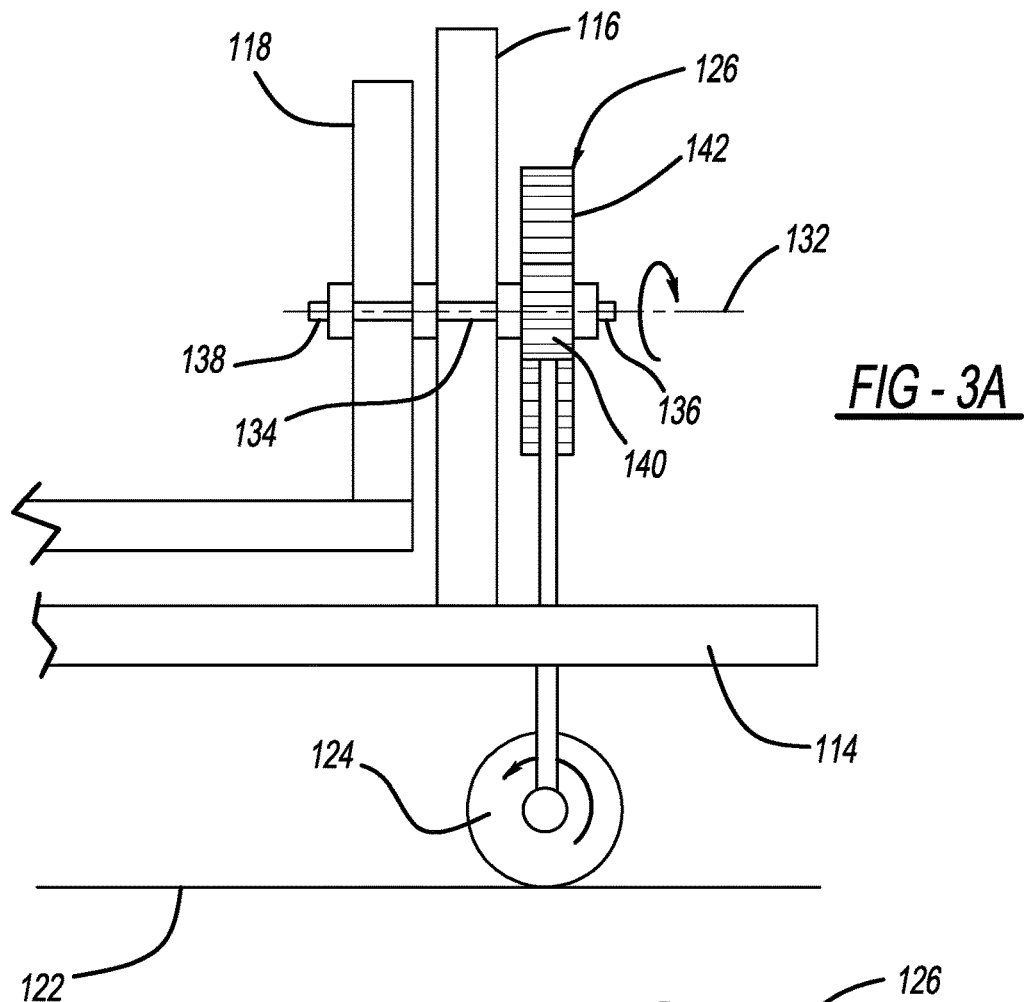
FIG. 3A is an enlarged view of a drivetrain for the rotational carrier of FIG. 2.
Figure 3B:
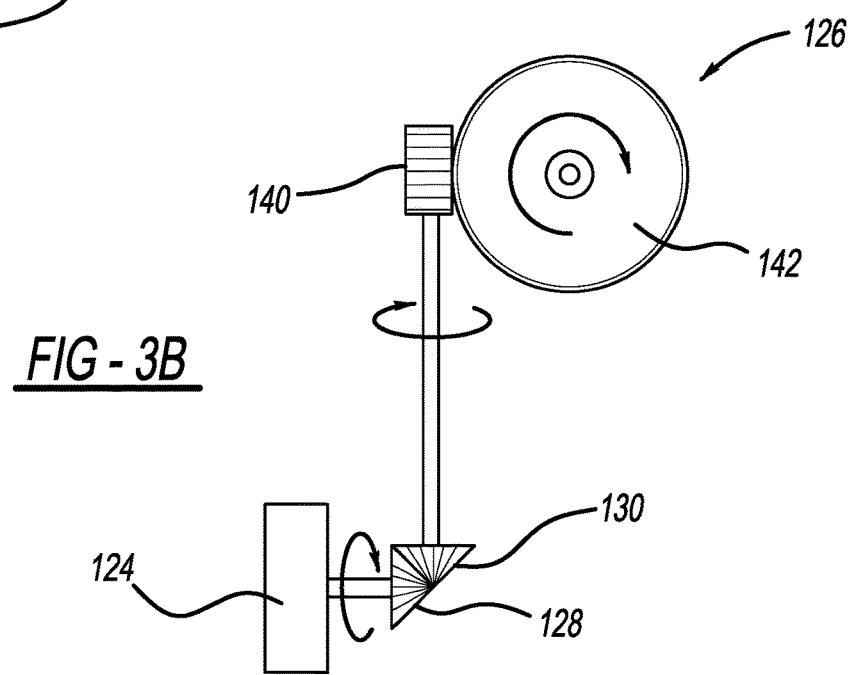
FIG. 3B is a front view of the drivetrain of FIG. 3A.

With continued reference to FIG. 2 and reference now to FIGS. 3A and 3B, the base frame 114 may have a drive wheel 124 extending from a bottom surface thereof for movement on a conveyor track 122 as the carrier 110 is pulled forward by the conveyor within a paint coating facility. The rotating fixture base 118 may be arranged in communication with the drive wheel 124 through a drivetrain 126. As the base frame 114 is moved during a conveyance cure process, the drive wheel 124 rotates through friction with the conveyor track 122. Alternately, if the friction force is not strong enough to move the drive wheel 124, a gear wheel can be paired with a gear track along the conveyor track 122.

The rotation of the drive wheel 124 provides a rotational force on a beveled drive gear 128 of the drivetrain 126. The beveled drive gear 128, in turn, rotationally drives a beveled driven gear 130 of the drivetrain 126. The beveled driven gear 130 may be fixedly secured to a worm 140, such that rotation of the beveled driven gear 130 is directly translated into rotation of the worm 140. Rotation of the worm 140, in turn, drives rotation of a worm gear 142 around an axis of rotation 132. The worm gear 142 may be secured to an axial shaft 134 at a first end 136 of the shaft 134. The shaft 134 may extend through the vertically extending legs 116 of the base frame 114, with a second end 138 of the shaft 134 being secured to the fixture base 118. Accordingly, the drivetrain 126 may be used as a manual drive source to rotationally drive the fixture base 118 at a predetermined spin rate. The predetermined spin rate is selected to be consistent with a drying speed for the coating material applied to the workpiece 112 (e.g., 1 to 10 RPM). As such, no surface of the workpiece 112 remains in a vertical orientation for an extended period, thereby minimizing the gravitational effects on the coating thickness. It is noted that similarly to the rotational carrier 10, the rotational carrier 110 may incorporate the turntable bearing arranged on the turntable base for providing another degree of freedom for yaw rotation to further minimize gravitational effects on coating thickness.

Figure 4:
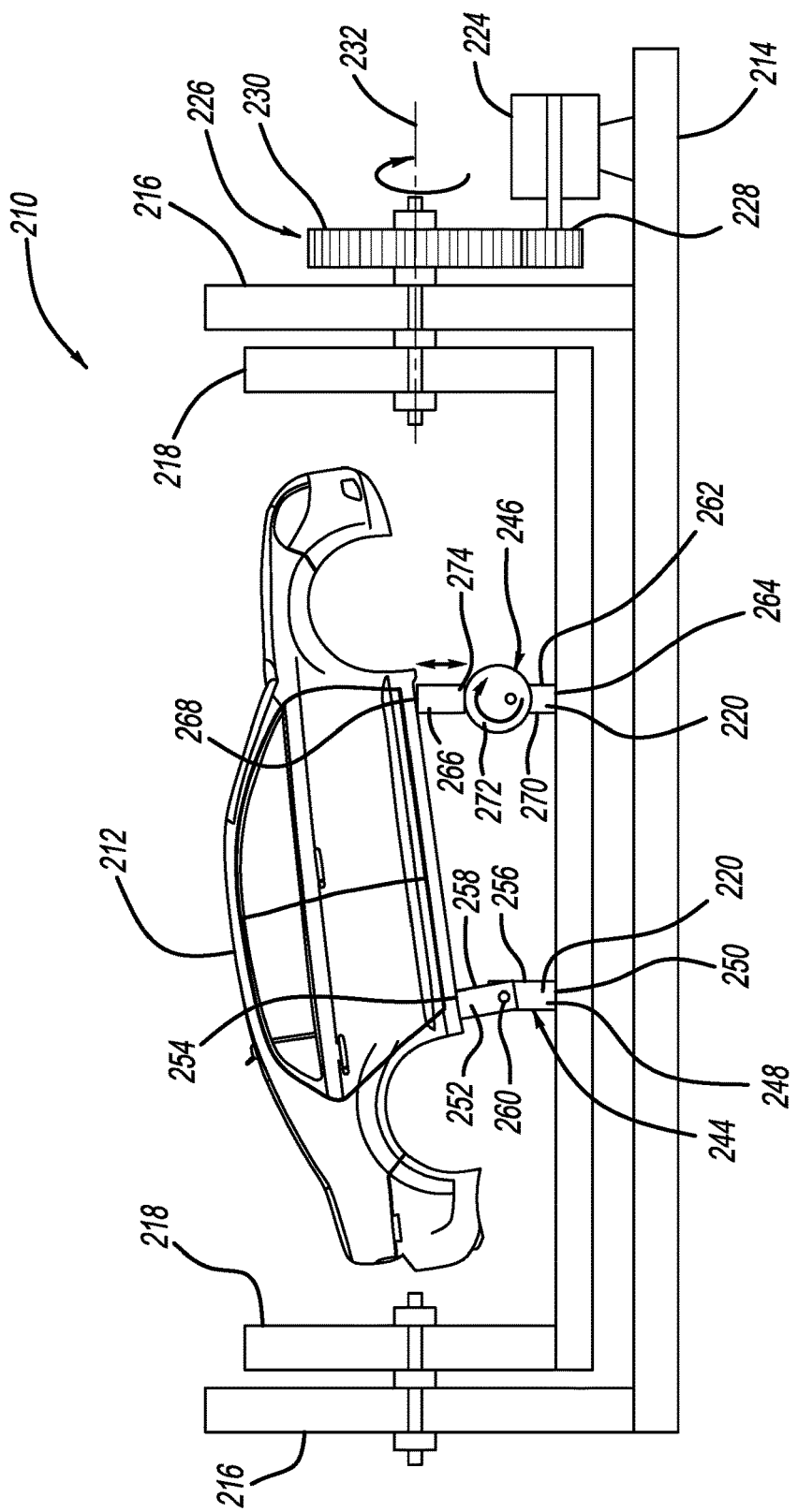
FIG. 4 is a perspective view of another rotational carrier according to the present disclosure.

Referring now to FIG. 4, another exemplary rotational carrier 210 according to the present disclosure is shown for use in a paint coating process for a workpiece 212 and includes a plurality of rotational axes. Various features of the rotational carrier 210 are similar to features of the rotational carrier 10, and therefore, like reference numerals will be used to describe like features. The exemplary rotational carrier 210 is also capable of rotation during the curing process, thereby neutralizing the gravity effect and providing a more uniform film coating thickness on all surfaces of the workpiece 212.

The rotational carrier 210 may include a base frame 214 having a pair of vertically extending legs 216 and a rotating fixture base 218 having a plurality of locators 220 (e.g., pivoting locator 244 and eccentric locator 246). The workpiece 212 may be secured to the fixture base 218 at the locators 220 and the fixture base 218 may be mounted to the vertically extending legs 216 of the base frame 214.

The pivoting locator 244 may have a lower support portion 248 secured to the fixture base 218 at a first end 250 of the lower support portion 248 and an upper support portion 252 secured to the workpiece 212 at a first end 254 of the upper support portion 252. A second end 256 of the lower support portion 248 and a second end 258 of the upper support portion 252 may be pivotably secured to each other through known designs, for example, through a pin interface 260.

The eccentric locator 246, similarly to the pivoting locator 244, may have a lower support portion 262 secured to the fixture base 218 at a first end 264 of the lower support portion 262 and a connecting cylinder or upper support portion 266 secured to the workpiece 212 at a first end 268 of the upper support portion 266. A second end 270 of the lower support portion 262 may include an eccentric cam 272 rotationally secured thereto. A second end 274 of the upper support portion 266 may act as a follower, such that the off-center rotation of the eccentric cam 272 causes movement of the upper support portion 266 in a direction toward and away from the fixture base 218. Rotation of the eccentric cam 272 may be driven by known devices, for example, by drive source 224.

As should be understood, the rotational carrier 210 may be used in a curing process, such that the drive source 224 provides a rotational force on a drive gear 228 of a gear set 226. The drive gear 228, in turn, rotationally drives a driven gear 230 of the gear set 226 around an axis of rotation 232 for rotationally driving the fixture base 218 at a predetermined spin rate, as previously described. Notably, however, the eccentric cam 272 provides additional motion for the workpiece 212 during rotation of the fixture base 218, thereby further minimizing the gravitational effects on the coating thickness. It is noted that similarly to the rotational carrier 10, the rotational carrier 210 may incorporate the turntable bearing arranged on the turntable base for providing another degree of freedom for yaw rotation to further minimize gravitational effects on coating thickness. In this way, yaw, pitch, and roll motion are provided for workpiece 212.

Embodiments of the present disclosure are described herein. This description is merely exemplary in nature and, thus, variations that do not depart from the gist of the disclosure are intended to be within the scope of the disclosure. For example, the disclosure may also be utilized in non-automotive environments, such as with industrial applications.

The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for various applications. Various combinations and modifications of the features consistent with the teachings of this disclosure, however, could be desired for particular applications or implementations.

What is claimed is:

1. A workpiece carrier, comprising:
    a base frame;
    a fixture base secured to the base frame;
    a plurality of locators, each of the plurality of locators secured at a first end to the fixture base and at a second end to a workpiece, wherein at least one of the plurality of locators is a pivoting locator having a lower pivot support portion secured to the fixture base and an upper pivot support portion secured to the workpiece, wherein the lower pivot support portion and the upper pivot support portion are pivotably secured together, wherein another of the plurality of locators is an eccentric locator having an upper eccentric support portion secured to the workpiece and a lower eccentric support portion secured to the fixture base, the lower eccentric support portion having an eccentric cam rotationally secured thereto, and wherein the upper eccentric support portion follows the eccentric cam such that rotation of the eccentric cam moves the workpiece toward and away from the fixture base; and
    a drive source in communication with the fixture base for rotationally driving the fixture base with respect to the base frame.

2. The workpiece carrier of claim 1, wherein the base frame includes a pair of extending legs defining an axis extending therethrough, and wherein the fixture base is secured to the extending legs such that rotation of the fixture base causes the workpiece to rotate around the axis.

3. The workpiece carrier of claim 2, wherein the drive source is a motor.

4. The workpiece carrier of claim 3, wherein the motor rotationally drives a gear set at a predetermined spin rate.

5. The workpiece carrier of claim 2, wherein the drive source is a drive wheel extending from the base frame for movement along a conveyor track, and wherein the drive wheel is in communication with the fixture base through a drivetrain.

6. The workpiece carrier of claim 1, wherein the base frame is secured to one of a ground surface and an automated guided vehicle.

7. A workpiece carrier, comprising:
    a base frame having a pair of extending legs;
    a fixture base secured to the base frame at the pair of extending legs;
    a plurality of locators, each of the plurality of locators secured at a first end to the fixture base and at a second end to a workpiece, wherein at least one of the plurality of locators is a pivoting locator having a lower pivot support portion secured to the fixture base and an upper pivot support portion secured to the workpiece, wherein the lower pivot support portion and the upper pivot support portion are pivotably secured together, wherein another of the plurality of locators is an eccentric locator having an upper eccentric support secured to the workpiece and a lower eccentric support portion secured to the fixture base, the lower eccentric support portion having an eccentric cam rotationally secured thereto, and wherein the upper eccentric support portion follows the eccentric cam such that rotation of the eccentric cam moves the workpiece toward and away from the fixture base; and a drivetrain for rotating the workpiece, wherein the drivetrain further comprises:
- a drive wheel extending from the base frame;
- a drive gear in communication with the drive wheel, the drive gear receiving a rotational force from the drive wheel;
- a driven gear in communication with the drive gear and with a worm, the driven gear receiving a rotational force from the drive gear; and
- a worm gear in communication with the worm and with the fixture base, the worm gear being rotationally driven by the worm, wherein rotation of the drive wheel rotationally drives the fixture base with respect to the base frame.

8. The workpiece carrier of claim 7, wherein the pair of extending legs of the base frame define an axis extending therethrough, and wherein the fixture base is secured to the extending legs such that rotation of the fixture base causes the workpiece to rotate around the axis.

9. The workpiece carrier of claim 8, wherein the drivetrain provides rotation of the workpiece at a predetermined spin rate.

10. The workpiece carrier of claim 7, wherein the drive wheel extends from the base frame for movement along a conveyor track.

11. A workpiece carrier, comprising:
- a base frame having a pair of extending legs;
- a fixture base secured to the base frame at the pair of extending legs;
- a drive source in communication with the fixture base for rotationally driving the fixture base with respect to the base frame;
- a pivoting locator having an upper pivot support portion and a lower pivot support portion pivotably secured together, wherein the upper pivot support portion is secured to a workpiece and the lower pivot support portion is secured to the fixture base; and
- an eccentric locator having an upper eccentric support portion and a lower eccentric support portion with an eccentric cam rotationally secured thereto, wherein the upper eccentric support portion is secured to the workpiece and the lower eccentric support portion is secured to the fixture base, and
- wherein the upper eccentric support portion follows the eccentric cam such that rotation of the eccentric cam causes movement of the workpiece toward and away from the fixture base.

12. The workpiece carrier of claim 11, wherein the extending legs define an axis extending therethrough, and wherein the fixture base is secured to the extending legs such that rotation of the fixture base causes the workpiece to rotate around the axis.

13. The workpiece carrier of claim 11, wherein the drive source is a motor that rotationally drives a gear set at a predetermined spin rate.

14. The workpiece carrier of claim 11, wherein the base frame is secured to one of a ground surface and an automated guided vehicle.

15. The workpiece carrier of claim 11, wherein the drive source is a drive wheel extending from the base frame for movement along a conveyor track, and wherein the drive wheel is in communication with the fixture base through a drivetrain.

* * * * *